(12) United States Patent
Kovesi et al.

(10) Patent No.: US 8,719,012 B2
(45) Date of Patent: May 6, 2014

(54) METHODS AND APPARATUS FOR CODING DIGITAL AUDIO SIGNALS USING A FILTERED QUANTIZING NOISE

(75) Inventors: Balazs Kovesi, Lannion (FR); Alain Le Guyader, Lannion (FR); Stéphane Ragot, Lannion (FR)

(73) Assignee: Orange, Paris (FR)

( * ) Notice: Subject to any disclaimer, the term of this patent is extended or adjusted under 35 U.S.C. 154(b) by 569 days.

(21) Appl. No.: 12/602,809

(22) PCT Filed: Jun. 13, 2008

(86) PCT No.: PCT/FR2008/051059
§ 371 (c)(1),
(2), (4) Date: Jan. 6, 2010

(87) PCT Pub. No.: WO2009/004227
PCT Pub. Date: Jan. 8, 2009

(65) Prior Publication Data
US 2010/0145712 A1 Jun. 10, 2010

(30) Foreign Application Priority Data

Jun. 15, 2007 (FR) .................................. 07 557792

(51) Int. Cl.
*G10L 21/00* (2013.01)
(52) U.S. Cl.
USPC .................. 704/227; 704/226; 704/200.1
(58) Field of Classification Search
USPC .................. 704/200–201, 226–228
See application file for complete search history.

(56) References Cited

U.S. PATENT DOCUMENTS 5,214,741 A * 5/1993 Akamine et al. ............ 704/274
5,651,090 A * 7/1997 Moriya et al. ............ 704/200.1
(Continued)

FOREIGN PATENT DOCUMENTS

| EP | 0 331 405 A2 | 9/1989 |
| EP | 0 466 190 A2 | 1/1992 |
| EP | 0 632 597 A2 | 1/1995 |

OTHER PUBLICATIONS

Chen, "Novel Codec Structures for Noise Feedback Coding of Speech," 2006 IEEE International Conference on Acoustics, Speech and Signal Processing, Toulouse, France, 14-19 May 2006, ICASSP 2006 Proceedings, Piscataway, NJ, USA, IEEE, pp. I-681-I-684 (May 14, 2006).

*Primary Examiner* — Douglas Godbold
(74) *Attorney, Agent, or Firm* — Drinker Biddle & Reath LLP

(57) ABSTRACT

The invention concerns an encoder for an input audio signal (S(z)) comprising a combination module combining the input audio signal with an intermediate counter-reaction signal forming a modified input signal and a quantification module scalable for the rate (91) of said modified input signal, delivering a binary raster of quantification indexes of a predetermined rate. This encoder is such that it comprises: a reverse quantification module (93) of a part of the quantification indexes of the binary raster corresponding to the indexes of a rate lower than the predetermined rate, for predetermining a reconstructed signal ($S_{Mic}(z)$), a module for determining (94) a quantification noise ($Q_{Mic}(z)$) derived from at least quantification modules and reverse quantification modules in series, a determination module (111) for a filtering function of the quantification noise from said reconstructed signal and a filtering module fit for applying (33) said filtering function to said quantification noise in order to obtain said intermediary counter-reaction signal. The invention also relates to an encoding method applied by the described encoder and a corresponding decoding method applied by a decoder.

13 Claims, 10 Drawing Sheets

(56) References Cited

U.S. PATENT DOCUMENTS

| | | | |
|---|---|---|---|
| 5,956,674 A * | 9/1999 | Smyth et al. | 704/200.1 |
| 6,496,798 B1 * | 12/2002 | Huang et al. | 704/230 |
| 6,584,438 B1 * | 6/2003 | Manjunath et al. | 704/228 |
| 7,684,980 B2 * | 3/2010 | Rousseau | 704/229 |
| 2006/0247926 A1 * | 11/2006 | Rousseau | 704/219 |
| 2006/0265216 A1 * | 11/2006 | Chen | 704/228 |
| 2010/0262420 A1 * | 10/2010 | Herre et al. | 704/201 |

\* cited by examiner

METHODS AND APPARATUS FOR CODING DIGITAL AUDIO SIGNALS USING A FILTERED QUANTIZING NOISE

CROSS-REFERENCE TO RELATED APPLICATIONS

This application is the U.S. national phase of the International Patent Application No. PCT/FR2008/051059 filed Jun. 13, 2008, which claims the benefit of French Application No. 07 557792 filed Jun. 15, 2007, the entire content of which is incorporated herein by reference.

FIELD OF THE INVENTION

The present invention concerns processing of sound data.

This processing is adapted in particular for the transmission and/or storage of digital signals such as audio-frequency signals (speech, music, etc.).

The present invention relates more particularly to waveform coding such as pulse code modulation (PCM).

BACKGROUND OF THE INVENTION

The general principle of PCM coding/decoding as specified by ITU-T Recommendation G.711 is described with reference to FIG. 1.

The PCM coder 13 includes a quantizing module $Q_{PCM}$ 10 that receives as input the input signal $S(z)$. The quantizing index $I_{PCM}$ at the output of the quantizing module 10 is transmitted via the transmission channel 11 to the decoder 14.

The PCM decoder 14 receives as input the indices $I'_{PCM}$ coming from the transmission channel, in a version possibly suffering from binary errors in $I_{PCM}$, and effects inverse quantization by the inverse quantizing module $Q^{-1}{}_{PCM}$ 12 to obtain the coded signal $\tilde{S}_{PCM}(z)$.

PCM coding as standardized by ITU-T Recommendation G.711 (hereinafter G.711) compresses the amplitude of the signals—which are defined with a minimum bandwidth of [300-3400 Hz] and sampled at 8 kHz—by a logarithmic curve that produces a signal to noise ratio that is practically constant for a wide signal dynamic range. The quantizing step in the domain of the original signal is proportional to the amplitude of the signals.

The compressed signal is quantized on 8 bits (256 levels). In the public switched telephone network (PSTN) these 8 bits are transmitted at a frequency of 8 kHz, yielding a bit rate of 64 kbit/s.

A G.711 quantized signal frame consists of quantizing indices coded on 8 bits. Accordingly, if the inverse quantization is implemented by means of a table, it consists simply in the index pointing to one of 256 possible decoded values.

In the A-law G.711 standard (Europe) or the μ-law G.711 standard (North America and Japan), the 8 bits are distributed in the following manner as represented at 15 in FIG. 1:

One sign bit S, three bits to indicate the segment and 4 bits to indicate the location in the segment.

The quantizing step in the coder generates quantizing noise that consists of the difference between the original signal and the decoded signal.

With a large number (256) of quantizing levels, the quantizing noise has a relatively flat spectrum as shown at 20 in FIG. 2. The spectrum of the signal (here a voiced signal block) having a wide dynamic range (~40 dB) is represented at 22 in FIG. 2. It can be seen that in areas of low energy the noise is very close to the signal and is therefore not necessarily masked. It can then become audible in these regions (from 2300 to 3500 Hz).

In the case of adaptive predictive speech coders, quantizing noise shaping techniques have been used to mask this noise and as far as possible render it inaudible. Because of the property of the human ear of masking simultaneous frequencies, it is possible to inject more quantizing noise in areas in which the signal has more energy. Noise shaping improves the spectral distribution of the quantizing noise by reducing the quantizing noise level in areas of low energy to redistribute it into areas of higher energy.

Such a technique is described for example in "Adaptive noise spectral shaping and entropy coding in predictive coding of speech" by J. Makhoul, M. Berouti in IEEE Trans. ASSP, Vol. 27-3, June 1979.

That document describes the use of linear filters taking the reconstructed signal into account. The quantizing noise shaping filter is derived from the linear predictive coding (LPC) synthesis filter. Thus the frame obtained at the output of this type of coder includes indices of linear prediction coefficients of the filters, a gain standardization factor index and the quantizing indices.

Moreover, in the above reference, the noise shaping filter is calculated from the synthesis filter reconstructed from the linear prediction coefficient indices. The noise shaping filter will therefore be subject to the coding noise of the linear prediction coefficients. Moreover, in the cited reference, the transfer function of the shaping filter has coefficients only in the numerator, calculated by two cascaded linear predictions. The two cascaded linear predictions each contributing their share of inaccuracy, the result, as clearly indicated in the cited reference, is that noise shaping is effective only for a number of coefficients at most equal to 2.

The paper by Makhoul and Berouti shows that quantizing noise shaping is possible in adaptive predictive systems characterized by a synthesis model consisting of an inverse quantizing module and a short-term predictive filter. Synthesis filters are used in the coding structure to obtain the appropriate shaping.

This technique is therefore not suitable for non-predictive coders that have no synthesis filters, like the PCM coder (in particular G.711 coders). Quantization including shaping—as described in the paper by Makhoul and Berouti—is effected in the domain of the linear prediction (or excitation) residue, i.e. after the original signal is filtered by a predictive filter $A(z)$. The coefficients of the filter $A(z)$ must therefore be sent to the decoder to effect synthesis filtering $1/A(z)$ after inverse quantization. Moreover, the noise shaping is effected by a second order reduced function $B(z)$ deduced from the function $A(z)$ sent.

The foregoing remark applies to the paper by J. H. Chen. "Novel codec structures for noise feedback coding of speech", Proc. Of ICASSP, 2006, PP.I-681:I-684, which builds on the paper by Makhoul and Berouti by incorporating a long-term predictor and quantizing noise shaping by a long-term shaping filter. Moreover, it is vectorial quantization that is effected in the paper by Chen et al.

SUMMARY OF THE INVENTION

The present invention offers a solution that is free of the drawbacks of the prior art.

To this end, the invention proposes a method of coding an input audio signal in which said input audio signal is combined with an intermediate feedback signal forming a modified input signal and including a bit rate scalable step of quantizing said modified input signal, delivering a quantizing index binary frame of predetermined bit rate, such that it further includes the following steps:

inverse quantization of some of the quantizing indices of the binary frame corresponding to the indices of a bit rate lower than the predetermined bit rate, to determine a reconstructed signal;

determining quantizing noise generated at least by the succession of the quantizing step and the inverse quantizing step;

determining a quantizing noise filter function from said reconstructed signal;

applying said filter function to said quantizing noise to obtain said intermediate feedback signal.

Thus the method of the invention produces a frame of quantizing indices that can be decoded by existing G.711 PCM decoders. The method of the invention improves the audio quality of the frame obtained in this way by taking the quantizing noise into account whilst preserving interoperability with existing decoders.

The quantizing noise is thus shaped by determining an appropriate filter function.

The binary frame consists only of scalar quantizing indices individually representing each sample of the signal, without having to transmit linear prediction coefficients.

This shaping therefore necessitates no transmission of coefficients to the decoder and can be implemented by a PCM coder with no synthesis filters.

The present invention shapes the quantizing noise only on minimum bit rate (core bit rate) quantization, advantageously by a G.711 PCM quantizing module, in the case of an interleaved code coder, for example. Thus on decoding, as a function of the bit rate allocated, it is possible to decode only a portion of the signal by core bit rate inverse quantization whilst benefiting from the improved signal quality obtained by quantizing noise shaping.

In one particular embodiment the bit rate scalable quantizing step provides at least core bit rate quantizing indices corresponding to PCM coding type core coding interoperable with the A-law or the µ-law of the ITU-T standard G.711.

In one embodiment of the invention, the filter function is determined by the arrangement of two linear prediction filters the coefficients of which are determined from the reconstructed signal.

This makes it possible to introduce an improvement on the decoder side by applying the filter calculation to the reconstructed signal in the same way as in the coder. It is then not necessary to transmit additional information for calculating the filters.

In another embodiment of the invention, the filter function is determined by the arrangement of two linear prediction filters the coefficients of which are determined from the input signal.

Accordingly, the coefficients taken into account to calculate the quantizing noise filter function do not depend on coded (and therefore degraded) synthesis filters that model the signal but depend directly on the input signal. Noise shaping will therefore be more appropriate.

In one particular embodiment, said intermediate feedback signal is calculated from a prediction of the quantizing noise and a prediction of the filtered quantizing noise, the filtered quantizing noise being obtained by adding the intermediate signal and the quantizing noise.

In one particular embodiment, the quantizing noise filter function is an autoregression adjusted mean (ARAM) filter.

Because this weighting function is in the form of a filter with coefficients in the numerator and in the denominator without the number of coefficients of the numerator being limited to two, noise shaping is improved.

In one embodiment of the invention, the quantizing noise weighting function is further calculated from periodicity characteristics of the input signal.

A weighting function taking into account the periodicity characteristics of the input signal enables additional modulation to be applied to the noise at the locations where the noise is greater, for example between the harmonics of the signal.

The invention is particularly suited to the situation where the quantizing index frame conforms to the ITU-T G.711 A-law or µ-law standard.

In a bit stealing embodiment, the step of scalable quantization of a predetermined bit rate is PCM scalar quantization interoperable with the ITU-T G.711 A-law or µ-law standard, the step of inverse quantization of the indices of bit rate lower than the predetermined bit rate is applied to 8-K bits of the binary frame to determine a reconstructed signal, and a step of inserting K data bits is also effected.

The invention also relates to an input audio signal coder including a combination module combining the input audio signal with an intermediate feedback signal to form a modified input signal and a bit rate scalable quantizing module for quantizing said modified input signal to deliver a binary frame of quantizing indices of predetermined bit rate. This coder is such that it further includes:

a module for inverse quantization of some of the quantizing indices of the binary frame corresponding to the indices of a bit rate lower than the predetermined bit rate, to determine a reconstructed signal;

a module for determining a quantizing noise ($Q_{PCM}(z)$) generated at least by the succession of the quantizing step and the inverse quantizing step;

a module for determining a quantizing noise filter function from said reconstructed signal;

a module for applying said filter function to said quantizing noise to obtain said intermediate feedback signal.

In the case of the interleaved coder the lower bit rate inverse quantizing module is advantageously of the ITU-T standard G.711 PCM type.

The invention also relates to a method for scalable decoding of an audio signal, including:

a first step of inverse quantization decoding quantizing indices of a first or core bit rate to form a reconstructed signal;

a second step of inverse quantization decoding quantizing indices of a second bit rate higher than the core bit rate, executed as a function of the bit rate received on decoding, to form a reconstructed signal of higher bit rate.

The method is such that it further includes:

a step of obtaining a difference signal between said core bit rate reconstructed signal and said higher bit rate reconstructed signal;

a step of determining a correction filter function from the reconstructed core bit rate signal;

a step of applying said correction filter function to said difference signal to obtain a corrective term;

a step of synthesizing a corrected reconstructed signal at higher bit rate by combining said corrective term and one of the reconstructed signals.

Thus on decoding, as a function of the bit rate allocated, it is possible to decode only part of the signal by core bit rate inverse quantization whilst obtaining the benefit of the improvement to the quality of the signal through quantizing noise shaping.

In one embodiment, said corrective term is applied to said core bit rate reconstructed signal.

In another embodiment, said corrective term is applied to said higher bit rate reconstructed signal.

The invention relates to an audio signal decoder including:
a first module of inverse quantization decoding quantizing indices of a first or core bit rate to form a reconstructed signal;
a second module of inverse quantization decoding quantizing indices of a second bit rate higher than the core bit rate, executed as a function of the bit rate received on decoding, to form a reconstructed signal of higher bit rate, The decoder is such that it further includes:
a module of obtaining a difference signal between said core bit rate reconstructed signal and said higher bit rate reconstructed signal;
a module of determining a correction filter function from the reconstructed core bit rate signal;
a filter module capable of applying said correction filter function to said difference signal to obtain a corrective term;
a module of synthesizing a corrected reconstructed signal at higher bit rate capable of combining said corrective term and one of the reconstructed signals.

Finally, the invention relates to a computer program intended to be stored in a memory of a coder or a decoder and/or on a memory medium adapted to cooperate with a reader of the coder or the decoder, including code instructions for executing the steps of the coding method described above and/or the decoding method described above when said program is executed by a processor of the coder or the decoder.

BRIEF DESCRIPTION OF THE DRAWINGS

Other features and advantages of the invention will become more clearly apparent on reading the following description, given by way of nonlimiting example only and with reference to the appended drawings, in which:

FIG. 2b represents a spectrum of a signal block related to the quantizing noise spectrum present in a coder of the invention;

DETAILED DESCRIPTION

Figure 1:
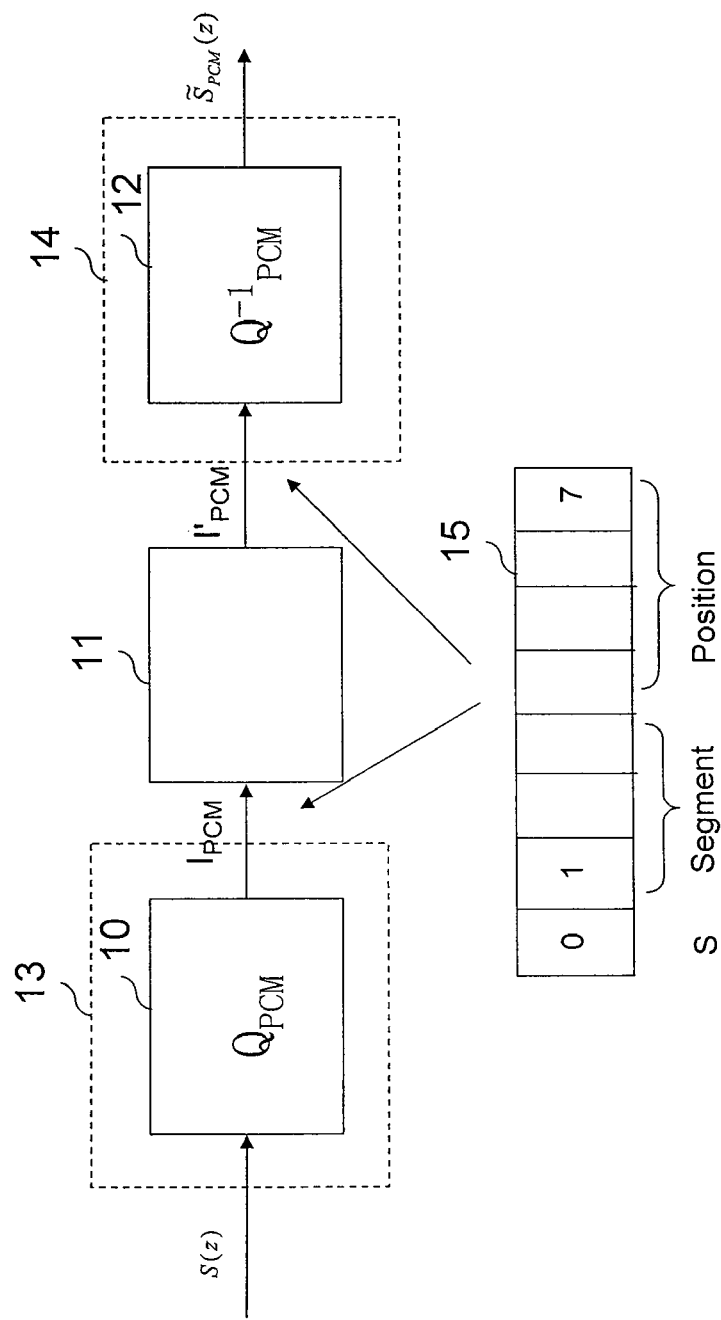
FIG. 1 shows a conventional prior art G.711 PCM coding/decoding system.

A coder 30 of the invention is described next with reference to FIG. 3. The corresponding decoder 14 is a standard decoder as described with reference to FIG. 1 that includes an inverse quantizing module 12 which in a preferred embodiment is a PCM inverse quantizing module.

The coder 30 includes a quantizing module 31 which in a preferred embodiment is a PCM quantizing module. It also includes an inverse quantizing module 32, preferably of PCM type.

According to the invention, a feedback loop includes a quantizing noise shaping module 33. For this purpose, to obtain the quantizing noise, this module receives as input both the input signal of the quantizing module and the signal $\tilde{S}_{PCM}(z)$ coming from the inverse quantizing module. This module determines a weighting function to be applied to the quantizing noise. Note that no filter coefficient or other parameter for shaping the quantizing noise is transmitted.

This weighting function can be constant and fixed once and for all, independently of the input signal.

Optionally, it can be adapted by an adaptation module 34 which receives as input the input signal to be coded and/or the output signal of the inverse quantizing module. The calculations carried out by this adaptation module are of the linear prediction type. They are described in detail with reference to FIGS. 6, 7 and 8.

The weighted quantizing noise is then combined with the input signal at 35. The combined signal is fed to the input of the quantizing module 31 which places on the transmission channel 11 a frame of quantizing indices of the G.711 frame type as defined with reference to FIG. 1, i.e. on 8 bits (sign, segment number and position in segment).

Figure 3:
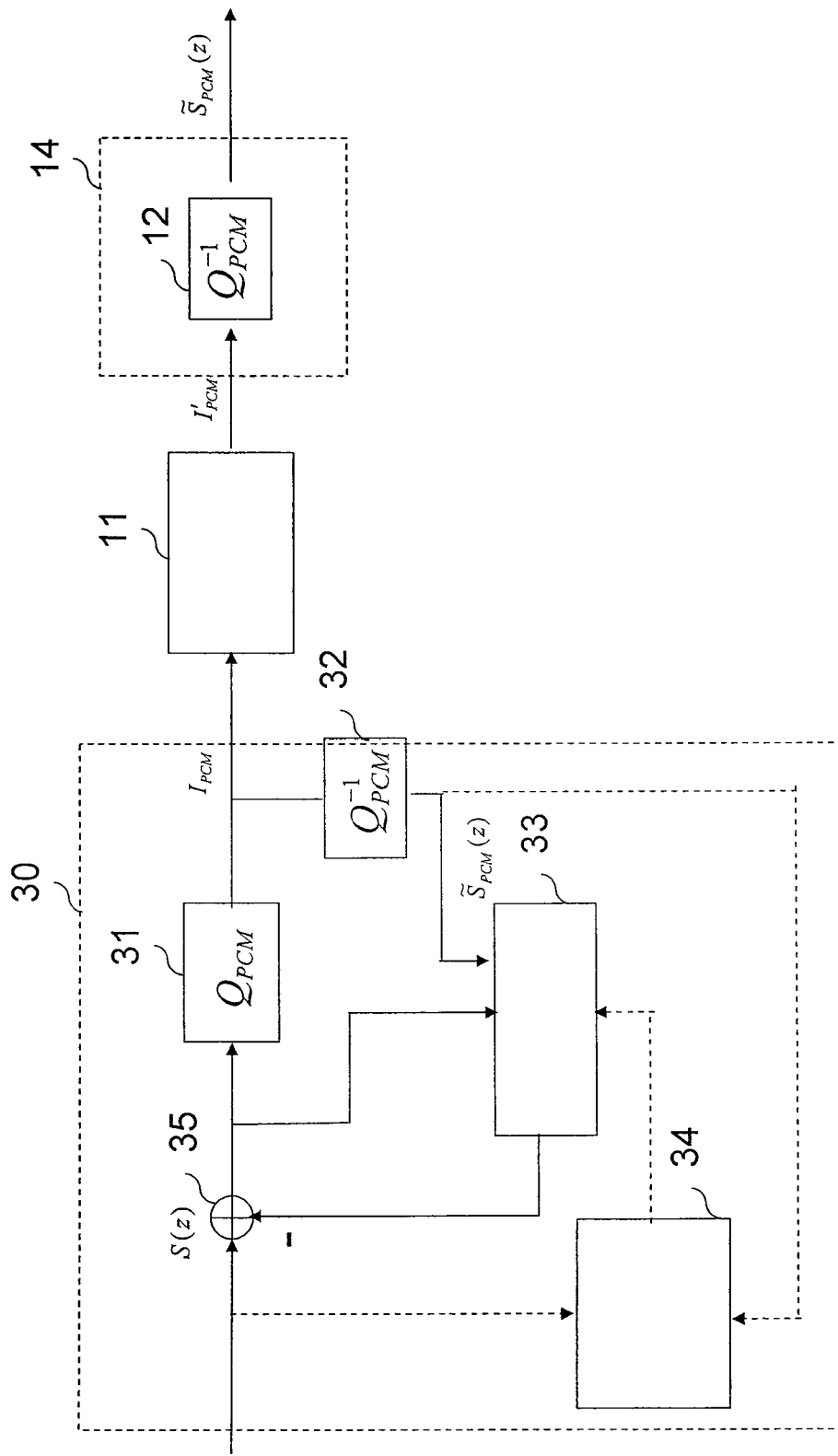
FIG. 3 is a general block schematic of a coder of the invention and an appropriate decoder.

FIG. 3 also illustrates the principal steps of the method of the invention implemented by the coder.

The coder therefore implements the method of the invention, which includes the steps of:
scalar quantization of the samples of the input signal combined with an intermediate feedback signal to obtain quantizing indices constituting a binary frame of quantizing indices;
determining a reconstructed signal from the quantizing indices by inverse scalar quantizing;
determining a quantizing noise generated by the succession of the quantizing and inverse quantizing steps;
determining a quantizing noise weighting function;
applying said weighting function to the quantizing noise to obtain said intermediate feedback signal corresponding to the weighted quantizing noise.

A computer program intended to be stored in a memory of the coder and/or on a memory medium adapted to cooperate with a reader of the coder includes code instructions for executing the steps of the method of the invention when said program is executed by a processor of the coder.

Accordingly, the standard decoder 14 can without modification decode the signal $I'_{PCM}$ received whilst benefiting from the improvement in quality obtained by the noise shaping effected in the coder 30.

In another possible application, it is possible on transmission between the coder and the decoder not to take into account one or more bits or to use one or more bits to transmit other data such as data produced by coding. In this case, the present invention, which improves coding quality, produces a signal quality equivalent to the quality obtained at present by standard G.711 PCM coders using fewer bits.

In another possible application in which the bit rate of the quantizing module is scalable, it is possible to extend PCM quantization to 9, 10 or more bits, preserving as the binary frame at the output of the coder the sign bit and the segment number and adding additional locations to the segments with the corresponding frame structure. When the number of locations for each segment is doubled, an additional bit is necessary for transmission. Also, in this case, the present invention improves the quality of coding regardless of the number of optional improvement bits decoded by the decoder.

A first embodiment of the invention is described next with reference to FIG. 4.

The coder 40 described here includes the same modules 31, 32, 34 and 35 as described with reference to FIG. 3. The decoder 14 is a standard decoder as described with reference to FIG. 1.

The operation of the quantizing noise shaping module 33 is described in detail next.

Initially, the quantizing noise $Q_{PCM}(Z)$ is obtained at 41 by establishing the difference between the input of the quantizing module 31 and the output of the inverse quantizing module 32.

Hereinafter the expressions time samples n or z transform are used interchangeably according to whether one or the other is the more practical. For example, s(n) denotes the time sample of the z transform S(z).

An arrangement of two filters—$A_{g1P}(z)$ filter 42 and $A_{g2P}(z)$ filter 44—produces a quantizing noise weighting function.

This arrangement functions in the following manner:

A first partial sum of the samples is effected by the filter $A_{g1P}(z)$ 42 which is of the form:

$$A_{g1P}(z) = \sum_{k=1}^{K_1} a_{g1}(k) z^{-k} \tag{1}$$

to produce at the output of the filter 42:

$$s_{g1P}(n) = \sum_{k=1}^{K_1} a_{g1}(k) q_{PCM}(n-k) \tag{2}$$

where $q_{PCM}(n)$ is the quantizing noise.

Filtered quantizing noise $q_{fPCM}(n)$ is obtained at 43 by adding the quantizing noise $q_{PCM}(n)$ to the signal $(-s_{g1P}(n))$ and to the signal $s_{g2P}(n)$ obtained by the second filter $A_{g2P}(z)$ at 44.

This second filter $A_{g2P}(z)$ is given by:

$$A_{g2P}(z) = \sum_{k=1}^{K_2} a_{g2}(k) z^{-k} \tag{3}$$

thus $q_{fPCM}(n)$ will be such that:

$q_{fPCM}(n)=q_{PCM}(n)+s_{g2P}(n)-s_{g1P}(n)$ where $S_{g2P}(n)$ is given by:

$$s_{g2P}(n) = \sum_{k=1}^{K_2} a_{g2}(k) q_{fPCM}(n-k) \tag{4}$$

The coefficients of the filters $A_{g1P}(z)$ and $A_{g2P}(z)$ are calculated by the adaptation module 34 using linear prediction methods. These calculations are described in detail hereinafter with reference to FIGS. 6, 7 and 8.

The difference between the signals $s_{g1P}(n)-s_{g2P}(n)$ effected at 45 constituting an intermediate feedback signal is then subtracted at 35 from the input signal to produce the input signal of the quantizing module 31.

The signal is then quantized and the quantizing noise at time n obtained from the difference between the input of the quantizing module and the output of the inverse quantizing module.

The expression for the signal reconstituted as a function of the signal to be coded and the quantizing noise is given by:

$$\tilde{S}_{PCM}(z) = S(z) + \frac{1 - A_{g1P}(z)}{1 - A_{g2P}(z)} Q_{PCM}(z) \tag{5}$$

As the quantizing noise is more or less white noise, the spectrum of the perceptible coding noise will be shaped by the filter $$\frac{1 - A_{g1P}(z)}{1 - A_{g2P}(z)} \left( \text{or } \frac{A_{g1}(z)}{A_{g2}(z)} \right)$$

characteristic of an autoregression adjusted mean (ARAM) filter.

As described hereinafter the numerator and the denominator are often calculated from a filter $$A_g(z) = 1 - \sum_{k=1}^{K} a_g(k) z^{-k}$$

by assigning coefficients $g_1$ and $g_2$ as follows:

$$\frac{A_{g1}(z)}{A_{g2}(z)} = \frac{1 - \sum_{k=1}^{K-1} a_g(k) g_1^k z^{-k}}{1 - \sum_{k=1}^{K-1} a_g(k) g_2^k z^{-k}}$$

This type of weighting function including a value in the numerator and a value in the denominator has the advantage of taking into account, through the value in the denominator, the peak of the signal and, through the value in the numerator, the attenuation of those peaks, thus achieving optimum quantizing noise shaping. The values of $g_1$ and $g_2$ are such that:

$1 > g_2 > g_1 > 0$

Figure 4:
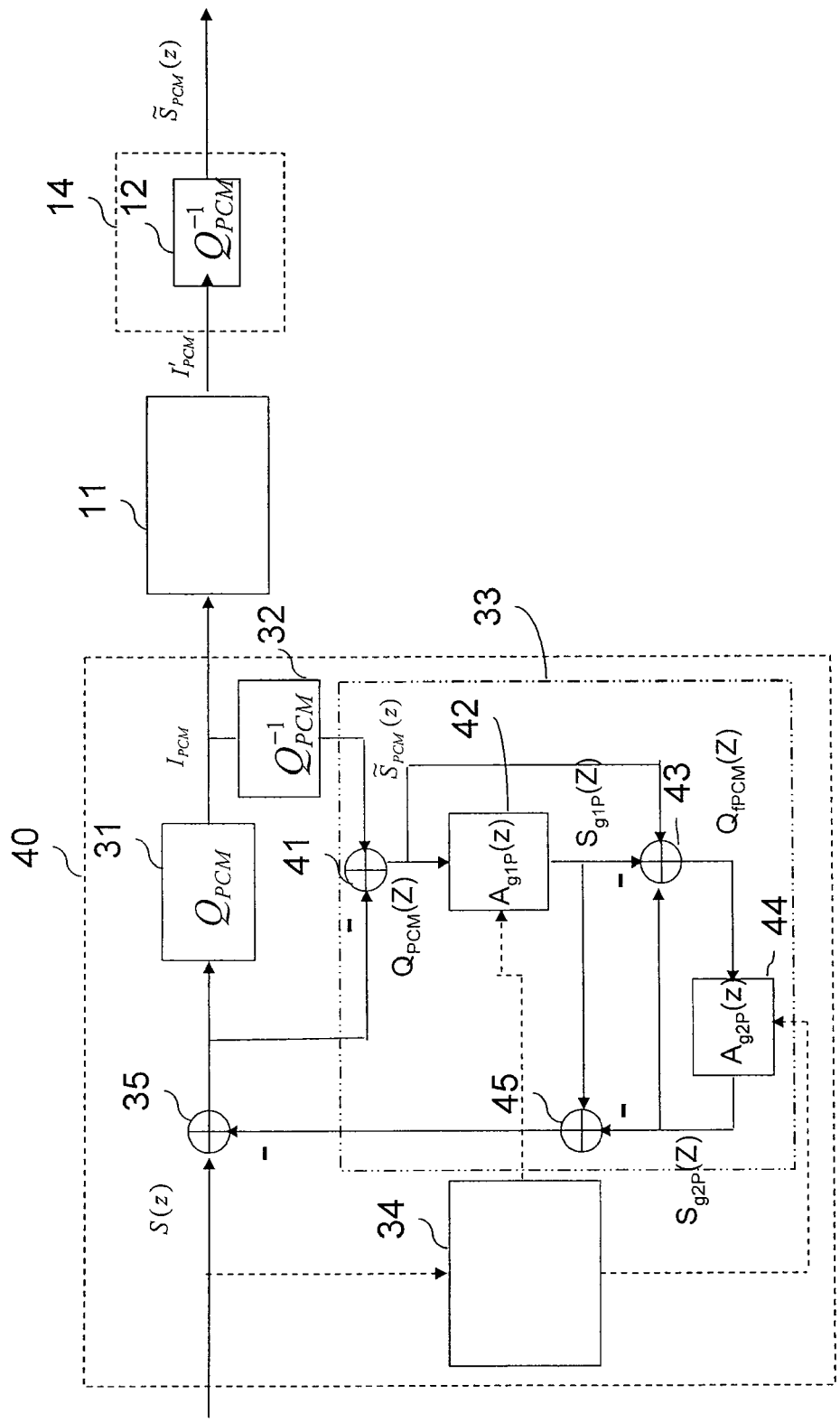
FIG. 4 is a block schematic of a first embodiment of a coder of the invention and an appropriate decoder.

Note that the FIG. 4 schematic can be generalized for cascaded ARAM filters in order to improve noise modeling for input signals with a wide dynamic range.

A second embodiment is described next with reference to FIG. 5. The coder 50 includes the same modules 31, 32, 34 as described with reference to FIGS. 3 and 4. Likewise, the decoder 14 is identical to that described with reference to FIGS. 3 and 4.

The noise shaping module 33 is described in detail next.

This filter includes the same arrangement 41, 43, 45 and filters 42, 44 described with reference to FIG. 4. Other filters $P_{p1}(z)$ and $P_{p2}(z)$ 51 and 56 are provided.

In the case of voiced signals and high-fidelity digital audio signals, despite shaping on the basis of the fine structure of the signal revealing the periodicities of the signal, reduces the perceived quantizing noise between the harmonics of the signal. The improvement is particularly significant in the case of signals with a relatively high fundamental frequency or pitch, for example above 200 Hz.

The shaping filter 51 as a function of defined structure of the spectrum is given by:

$$P_1(z)=1-P_{P1}(z) \quad (6)$$

where $P_{P1}(z)$ is a partial filter given by:

$$P_{P1}(z) = \sum_{k=-M_P}^{M_P} p_{1M_P}(k)Z^{-(Pitch+k)} \quad (7)$$

where Pitch is the number of samples of one period of the signal, $2M_P+1$ is the number of coefficients of the partial filter, and $p1M_p(k)k=-M_P, \ldots, M_P$ are the coefficients of the filter.

The shaping filter 56 as a function of the denominator is given by:

$$P_2(z)=1-P_{P2}(z)$$

Where $P_{P2}(z)$ is a partial filter given by:

$$P_{P2}(z) = \sum_{k=-M_P}^{M_P} p_{2M_P}(k)Z^{-(Pitch+k)}$$

The arrangement 52, 54, 55 and 53 of the filters 51 and 56 with the filters 42 and 44 is such that the decoded signal $\tilde{S}_{PCM}(z)$ is given as a function of the signal to be coded and the shaping filters by:

$$\tilde{S}_{PCM}(z) = S(z) + \frac{1 - P_{P1}(z)}{1 - P_{P2}(z)} \frac{1 - A_{g1P}(z)}{1 - A_{g2P}(z)} Q_{PCM}(z) \quad (8)$$

The filter $1-P_{P1}(z)$ has $2M_P$ zeros inside the unity circle, conjugate complexes such that, when the variable z runs around the unity circle, the frequency response of $1-P_{P1}(z)$ has $M_P$ maxima characteristics of the fine structure of the spectrum and corresponding to the periodicity of the signal.

The partial predictors $P_{P1}(z)$ and $P_{P2}(z)$ are calculated from the input signal using linear prediction techniques.

Figure 2:
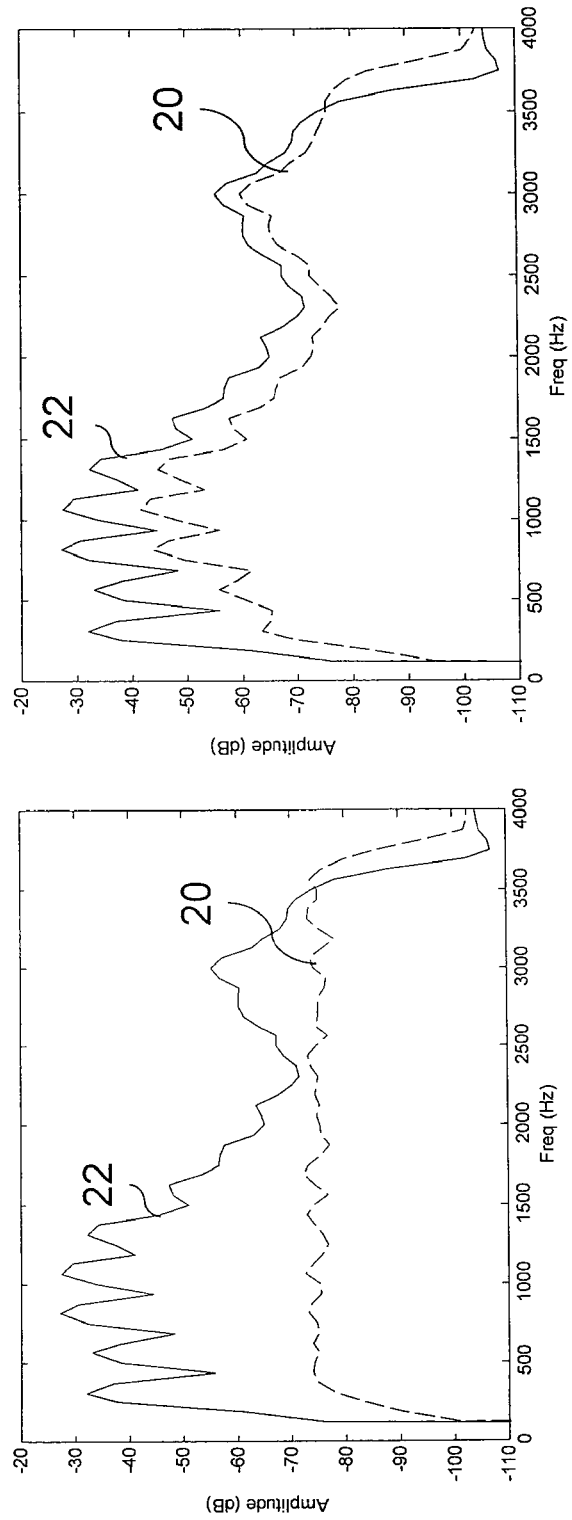
FIG. 2 represents a spectrum of a signal block related to the quantizing noise spectrum present in a coder not implementing the present invention.
Figure 5:
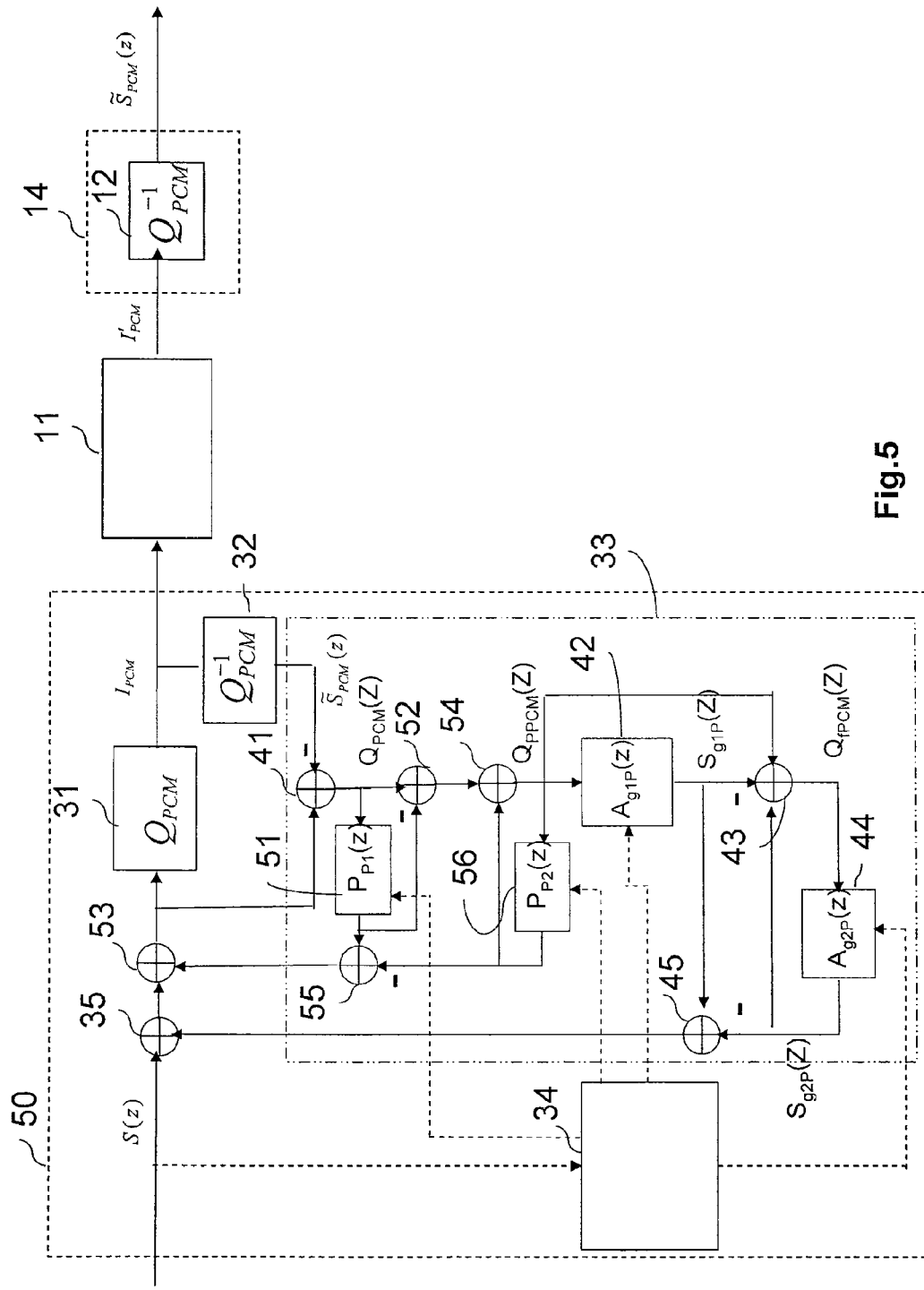
FIG. 5 is a block schematic of a second embodiment of a coder of the invention and an appropriate decoder.

FIG. 2b represents the spectrum of the same voiced signal block as FIG. 2 but, in contrast to FIG. 2, the quantizing noise has been shaped by applying the FIG. 5 variant of the invention. It can be seen that the noise tracks both the formants and the harmonics; it is always below the level of the signal, which implies that this renders the noise inaudible.

Figure 6:
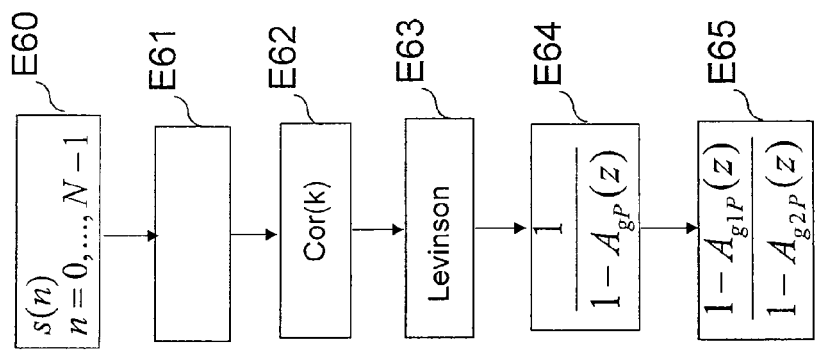
FIG. 6 is a flowchart representing the steps of a first calculation mode for a quantizing noise shaping filter of the invention.

The first linear predictive calculation mode for the shaping filters, such as the filters 42 and 44 in FIGS. 4 and 5, is described next with reference to FIG. 6.

This first embodiment is described in the form of an algorithm to be implemented by the adaptation module 34 described with reference to FIGS. 3, 4 and 5.

In step E60, the module 34 receives an input signal block that corresponds to either the current block if PCM quantization is effected per signal block or the signal from the preceding block if PCM quantization is effected per sample.

The signal block is then weighted by a Hanning window in step E61. Other windows are possible such as the Kaiser window for example.

The K+1 correlation coefficients are then calculated in step E62 from:

$$Cor(k) = \sum_{n=0}^{N-1} s(n)s(n-k) \quad (9)$$

$$k = 0, \ldots, K$$

The coefficients of the AutoRegression (AR) filter that models the envelope of the signal are provided in step E63 by the Levinson-Durbin algorithm:

There is therefore obtained in step E64 an $A_g(z)$ filter, the filter with transfer function $$\frac{1}{A_g(z)} = \frac{1}{1 - A_{gP}(z)}$$

modeling the envelope of the input signal.

When this calculation is used for both $A_{g1}$ and $A_{g2}$ filters 42 and 44 of the coder of the invention, there is therefore obtained in step E65 a shaping filter given by:

$$\frac{A_{g1}(z)}{A_{g2}(z)} = \frac{1 - \sum_{k=1}^{K} a_g(k)g_1^k z^{-k}}{1 - \sum_{k=1}^{k} a_g(k)g_2^k z^{-k}} \quad (10)$$

A second filter calculation mode is described next with reference to FIG. 7.

In step E70, there is taken as input a signal block that corresponds to either the current block if PCM quantization is effected per signal block or the signal from the preceding block if PCM quantization is effected per sample.

The signal block is then weighted in step E71 by a weighting window, after which a masking curve is calculated in step E72. This curve represents the maximum noise level acceptable from an inaudibility point of view. An example of efficient calculation is given for audio coding in Y. Mahieux, J. P. Petit, "High quality audio transform coding at 64 kbit/s", IEEE Trans. on Com., Vol. 42-11, November 1994.

The coefficients of the masking curve represent a power spectral density. This density is approximated by an AutoRegression filter $$\frac{1}{A_g(z)}.$$

For this purpose an inverse Fourier transform of the masking curve M(z) is first effected in step E73 to obtain the representative correlation coefficients.

The coefficients of the AR filter that models the masking curve are given by the Levinson-Durbin algorithm in step E74 to yield the AutoRegression shaping filter in step E75:

$$\frac{1}{A_g(z)} = \frac{1}{1 - \sum_{k=1}^{K} a_g(k)z^{-k}} \quad (11)$$

In this case the ARAM masking filter is reduced to an autoregression filter (no numerator) that models the masking curve. This approach can be of benefit because the PCM coder can also code music (e.g. music on hold) in a narrower band [0-4 kHz] and in this case it is more accurate to use the masking curve.

This calculation mode can therefore be applied to the $A_{g2}$ filter from FIG. 4, the $A_{g1}$ filter being set to 0.

Figure 8:
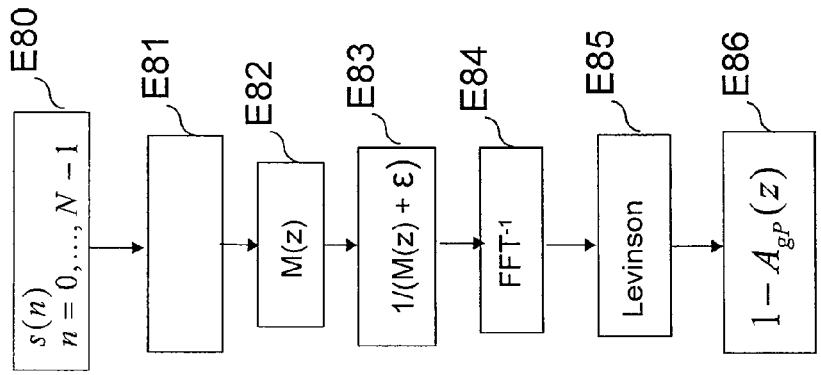
FIG. 8 is a flowchart representing the steps of a third way calculation mode for a quantizing noise shaping filter of the invention.

A third filter calculation mode used is described next with reference to FIG. 8. In step E80, a signal block is taken as input that corresponds to either the current block if PCM quantization is effected per signal block or the signal from the preceding block if PCM quantization is effected per sample.

Figure 7:
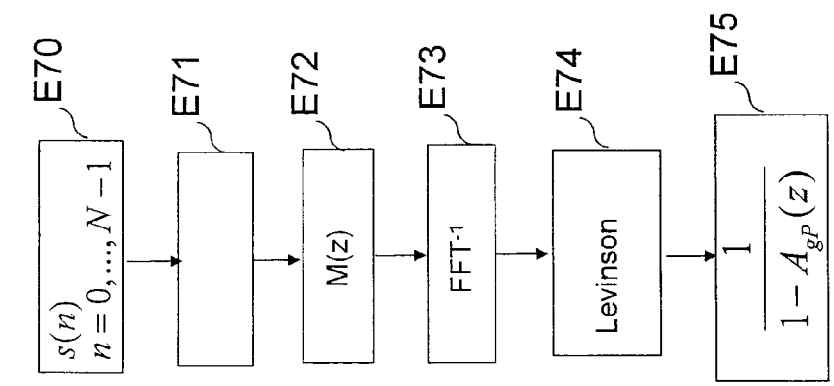
FIG. 7 is a flowchart representing the steps of a second calculation mode for a quantizing noise shaping filter of the invention.

The signal block is then weighted in step E81 by a weighting window, after which the masking curve is calculated in step E82 as in the previous situation shown in FIG. 7. The coefficients of the masking curve represent a power spectral density that is approximated in the present case by an adjusted mean filter $A_g(z)$. For this purpose, the inverse of the masking curve is obtained in step E83, taking care to limit the amplitudes resulting from low values of $M(z)$ and in step E84 an inverse Fourier transform of $$\frac{1}{M(z) + \varepsilon}$$

provides the representative correlation coefficients.

The coefficients of the AR filter that models the inverse of the masking curve are produced in step E85 by the Levinson-Durbin algorithm:

$$A_g(z) = 1 - \sum_{k=1}^{K} a_g(k)z^{-k} \quad (12)$$

The $1-A_g(z)$ adjusted mean filter defined in this way has no coefficients in the denominator and will be the AM filter that models the masking curve.

This calculation mode can thus be applied to the $A_{g1}$ filter from FIG. 4, the $A_{g2}$ filter being set to 0.

A fourth shaping filter calculation mode is possible. It has the advantage that it does not necessitate storing the signal in blocks and thus yields a minimum delay coding system. In this mode, the coefficients of the ARAM shaping filter are adapted for each sample by a gradient algorithm. The coefficients of the ARAM filter that model the input signal s(n) as described in FIG. 6, for example, are calculated first.

The error signal is given as a function of the signal s(n) by:

$$e(n) = s(n) - \sum_{k=1}^{K_D} a(k)s(n-k) + \sum_{k=1}^{K_N} b(k)e(n-k) \quad (13)$$

The ARAM filter coefficient adaptation algorithm is deduced by taking the gradient of $e^2(n)$:

$$a(k,n) = \alpha_D a(k,n-1) + \beta_D e(n)s(n-k) \, k=1, \ldots, K_D \quad (14)$$

$$b(k,n) = \alpha_N b(k,n-1) + \beta_N e(n)e(n-k) \, k=1, \ldots, K_N \quad (15)$$

From the coefficients that model the signal s(n), the shaping filter is calculated by applying weighting $g_1$ and $g_2$ to the ARAM filter modeling s(n) to obtain:

$$\frac{A_{g1}(z)}{A_{g2}(z)} = \frac{1 + \sum_{k=1}^{K_N} b(k)g_1^k z^{-k}}{1 - \sum_{k=1}^{K_D-1} a(k)g_2^k z^{-k}} \quad (16)$$

Another embodiment of a coder of the invention is described next with reference to FIG. 9.

Figure 9:
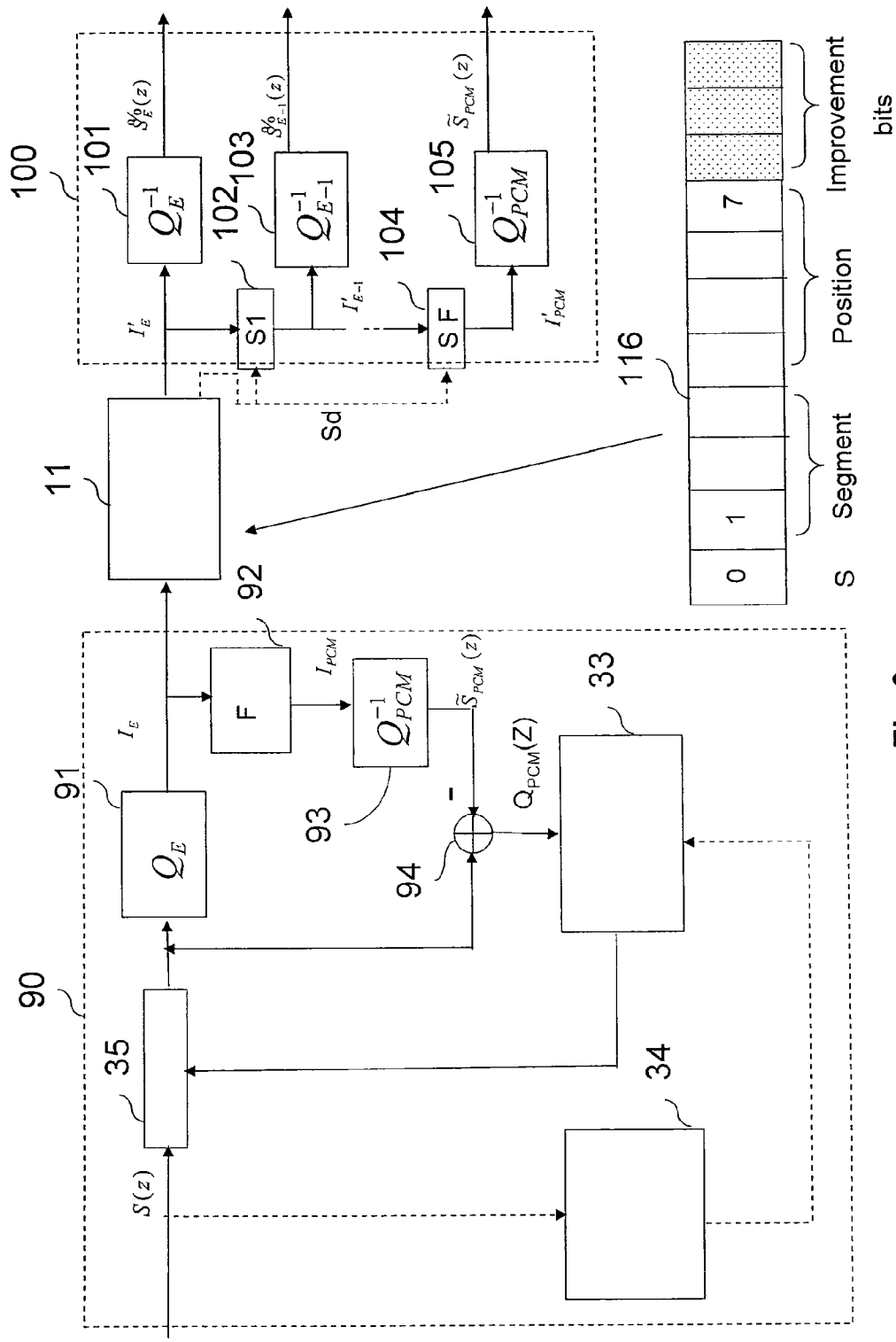
FIG. 9 is a block schematic of a coder of the invention with an interleaved structure quantizing module and an appropriate decoder.

In this embodiment, the 8-bit PCM quantizing module is expanded to a PCM quantizing module of 9, 10 or more bits by retaining as the binary frame at the coder output the sign bit and the segment number and adding additional locations to the segments as shown in FIG. 9 with the corresponding frame structure 116. When the number of locations for each segment is doubled, an additional bit is necessary for transmission.

FIG. 9 shows an example of interleaved PCM quantization in which the noise shaping module 33 as described in the embodiments of FIG. 3, 4 or 5 is retained, along with the adaptation module 34.

The interleaved PCM quantizing module $Q_E$ 91 is in a quantizing noise shaping feedback loop. It generates a code $I_E$ at the output of the interleaved quantizing module $Q_E$ of higher bit rate of E bits. The quantizing noise is shaped at the output of the PCM inverse quantizing module 93 of 8 core bits that corresponds for example to the G.711 PCM quantizing module. This must be fed with an index $I_{PCM}$ obtained from $I_E$ by eliminating the F least significant improvement bits by means of the module 92, i.e. F is such that:

$$E = 8 + F$$

This inverse quantizing module of 8 core bits may be referred to as the core inverse quantizing module that has the minimum core bit rate of 8 bits.

The quantizing noise weighting function applied by the module 33 of the invention is applied to the quantizing noise coming from this core inverse quantizing module.

In the decoder the received quantizing index frame $I'_E$ is decoded by the inverse quantizing module $Q_E$ 101 to produce the highest bit rate decoded signal $\tilde{S}_E(n)$.

If operation at a bit rate of E-1 bits is signaled (case Sd in the decoder, i.e. bit rate signaling), the least significant improvement bit of $I'_E$ is masked, which gives an index on $I'_{E-1}$ on E-1 bits. This operation is signaled in step 102 by the operator S1.

The output $\tilde{S}_{E-1}(n)$ on E-1 bits is obtained at the output of the inverse quantizing module $Q_{E-1}$ 103 fed with the index $I'_{E-1}$, and so on up to SF where E-8 improvement bits are eliminated by the operation SF in step 104 to produce the index that produces the output $\tilde{S}_{PCM}(n)$ of the inverse 8-bit PCM quantizing module. If at any point in transmission only the 8 PCM bits are retained, the resulting index can be decoded by a standard PCM decoder.

Thus it can be shown by means of the z transform that quantizing noise shaping is effective. The expression for the signal $\tilde{S}_{PCM}(z)$ is:

$$\tilde{S}_{PCM}(z) = S(z) + \text{Mask}(z) Q_{PCM}(z) \quad (17)$$

in which Mask(z) is given by:

$$\text{Mask}(z) = \frac{1 - A_{g1P}(z)}{1 - A_{g2P}(z)} \quad (18)$$

if the FIG. 4 shaping structure is adopted.

The high bit rate signal $\tilde{S}_E(z)$ will be given by:

$$S_E^{\%}(z) = S(z) + \text{Mask}(z) Q_E(z) - [1 - \text{Mask}(z)] Q_F(z) \quad (19)$$

in which $Q_F(z)$ is equal to the difference between the output signals of the quantizing modules $Q_{PCM}$ and $Q_E$ such that:

$$Q_F(z) = Q_{PCM}(z) - Q_E(z) \quad (20)$$

A variant is described next with reference to FIG. 10 that is an improvement on the embodiment described with reference to FIG. 9.

For the FIG. 9 structure, equation 19 shows that the signal $\tilde{S}_E(z)$ contains a parasitic term $P_{arE}(z)$ related to the non-interleaved and optimum quantizing module:

$$\text{Par}_E(z) = [1 - \text{Mask}(z)] Q_F(z) \quad (21)$$

Note that for the low PCM bit rate the optimum configuration applies and there is no parasitic term in equation 17.

To be able to reconstitute the parasitic term in the decoder, it is necessary for the module 111 to adapt the filters on the basis of one of the reconstituted signals. As $\tilde{S}_{PCM}(z)$ is always present, it is natural to choose that signal for adapting the shaping filters.

Figure 10:
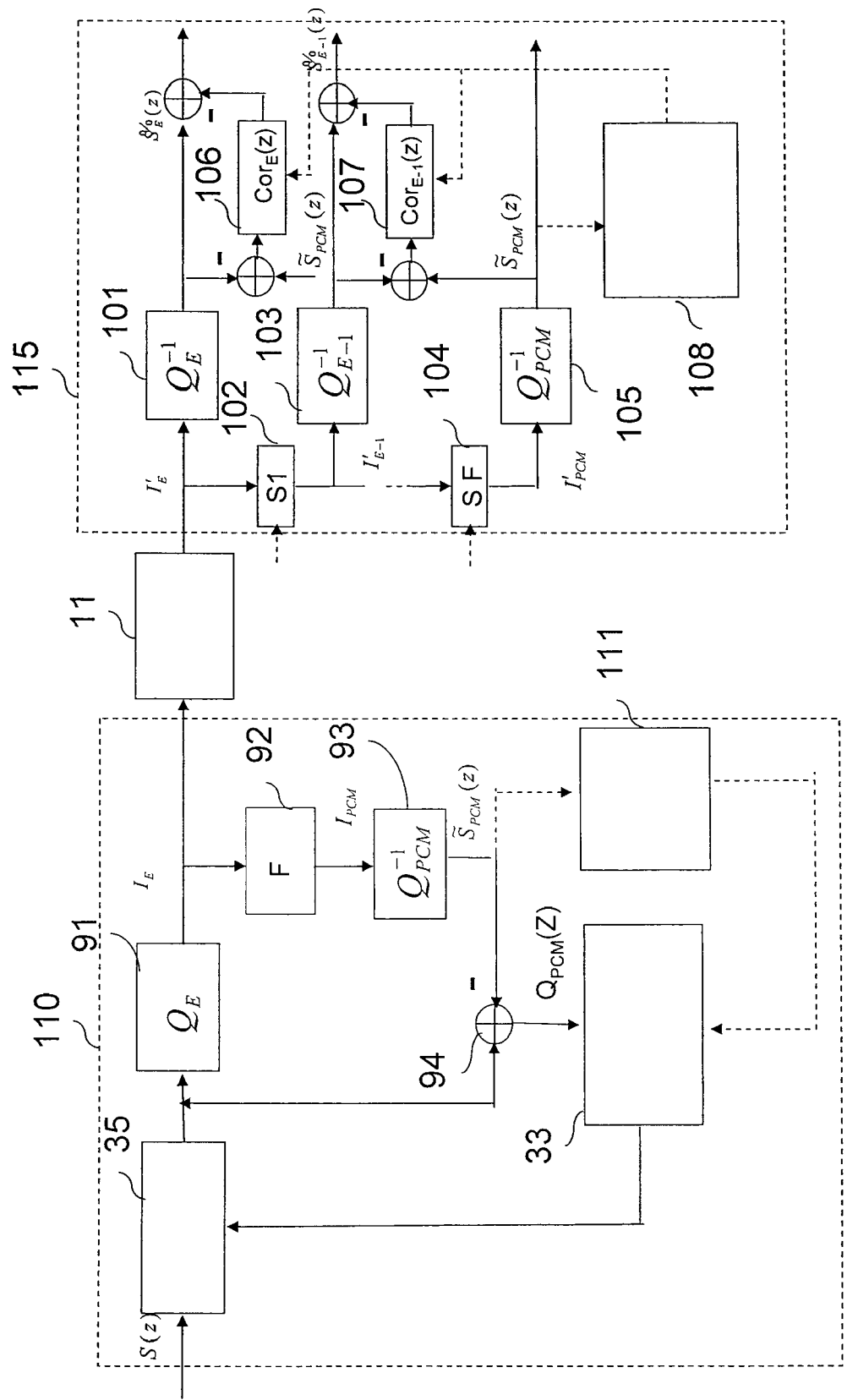
FIG. 10 is a block schematic of a variant of a coder of the invention with an interleaved structure quantizing module and an appropriate decoder.

The only difference between the FIG. 9 coder and the FIG. 10 coder is that in the coder 110 the shaping filters are adapted in the filter 111 on the basis of the signal $\tilde{S}_{PCM}(z)$, this signal being present in the decoder in all cases.

The shaping filters are also adapted in the decoder by the module 108 on the basis of the signal $\tilde{S}_{PCM}(z)$, this signal being available in all bit rate configurations. In the absence of transmission errors, the adaptation of the filters will be exactly the same in the coder and in the decoder.

The interleaved part of the decoder is obtained from the decoder described in FIG. 9 by modifying the outputs of the inverse quantizing modules using a corrective term obtained from the output of the $\text{Cor}_k(z)$ filter fed with the difference between $\tilde{S}_{PCM}(z)$ and $\tilde{S}_{Qk}(z)$, k being the number of bits of the quantizing module concerned and $\tilde{S}_{Qk}(z)$ the output of the inverse quantizing module k. The corrective terms are therefore introduced into the decoder in step 106 for $\text{Cor}_E(z)$, in step 107 for $\text{Cor}_{E-1}(z)$, etc.

The correction filter is given by:

$$\text{Cor}_k(z) = [1 - \text{Mask}(z)][Q_{PCM}(z) - Q_k(z)] \quad (22)$$

Figure 11:
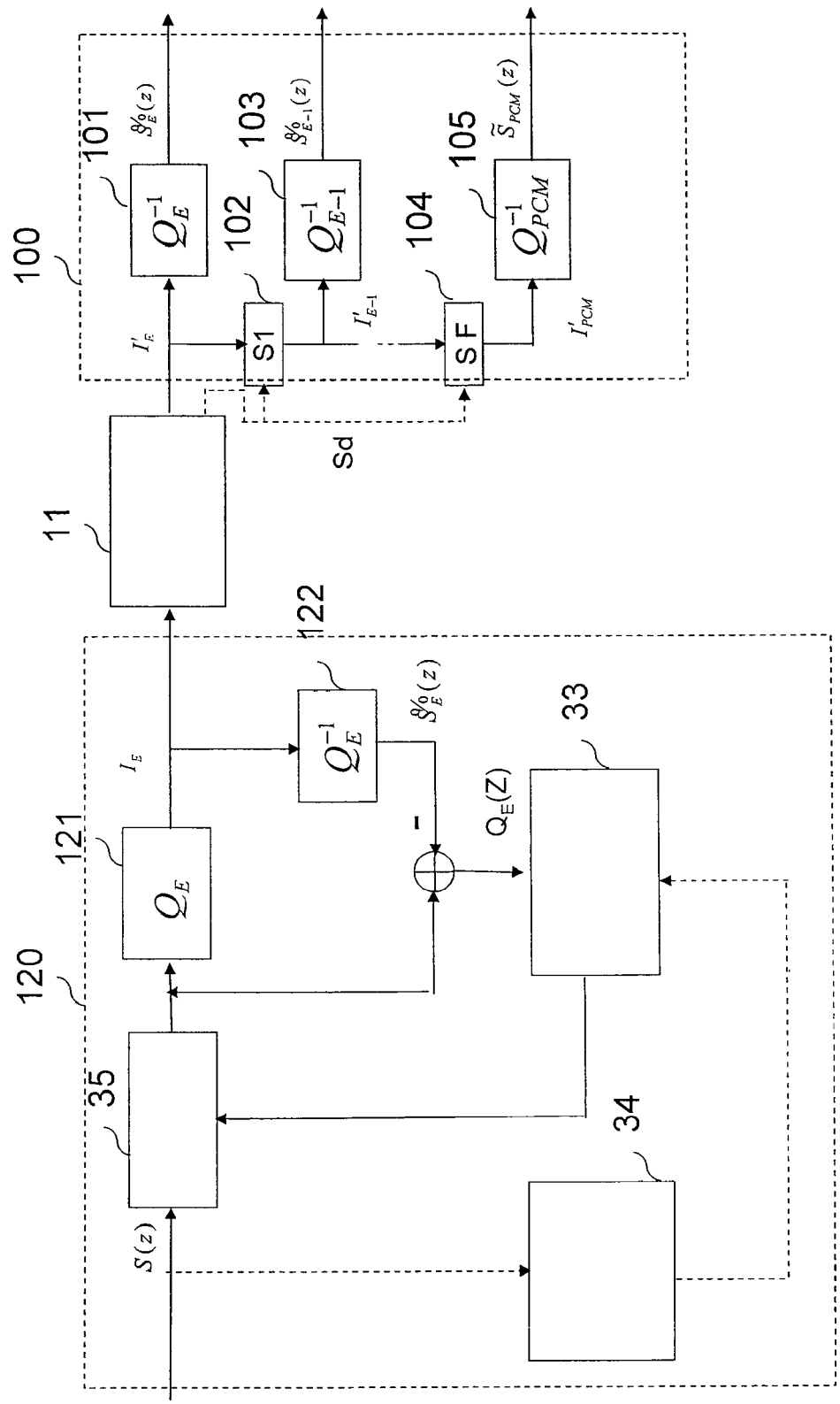
FIG. 11 is a block schematic of another embodiment of a coder of the invention and an appropriate decoder.

Another embodiment of the invention for an interleaved structure coder is described next with reference to FIG. 11.

In the present case, noise shaping is effected for high bit rate quantization. In this figure the interleaved quantizing module $Q_E$ 121 of the coder 120 is in a quantizing noise shaping feedback loop. It generates a code $I_E$ at the output of the interleaved quantizing module $Q_E$ of higher bit rate on E bits. The quantizing noise is shaped on the basis of the output of the inverse quantizing module $Q_E^{-1}$ 122 of 9, 10 or more bits, fed with the index $I_E$.

In the decoder the received index $I'_E$ is decoded by the inverse quantizing module (table) $Q_E$ 101 to produce the higher bit rate decoded signal $\tilde{S}_E(n)$.

When operation at a bit rate of E−1 bits is signaled (case Sd in the decoder, i.e. bit rate signaling), the least significant bit of $I'_E$ is masked by the operation S1 in step 102, which produces an index $I'_{E-1}$ on E−1 bits.

The output $\tilde{S}_{E-1}(n)$ on E−1 bits is obtained at the output of the inverse quantizing module $Q_{E-1}$ 103 fed with the index $I'_{E-1}$, and so on up to SF, where E−8 bits are eliminated to give the index $I'_{PCM}$ that produces the output $\tilde{S}_{PCM}(n)$ of the inverse 8-bit PCM quantizing module.

Using the z transform, it can be shown that the signal $\tilde{S}_E(z)$ is given by:

$$S_E^{\%}(z) = S(z) + [1 - B_P(z)] Q_E(z) \quad (23)$$

The output signal of the PCM quantizing module will be given by:

$$\tilde{S}_{PCM}(z) = S(z) + [1 - B_P(z)] Q_E(z) + Q_F(z) \quad (24)$$

where $Q_F(z)$ is the difference in the transmitter between the output of the inverse quantizing module $Q_E^{-1}$ and the output of the inverse PCM quantizing module $Q_{PCM}^{-1}$.

In the present case, at the output of the PCM quantizing module the term $Q_F(z)$ is not generally known because the least significant bits of $I_E$ have been eliminated and it is therefore not possible to eliminate this term. The noise generated in the inverse PCM quantization configuration will therefore be partially shaped by the sum of a noise component $Q_F(z)$ (practically white noise) and a shaped noise component $[1 - B_p(z)] Q_E(z)$.

Obviously, the quantizing noise can equally be shaped for an intermediate bit rate between the core bit rate and the higher bit rate.

Figure 12:
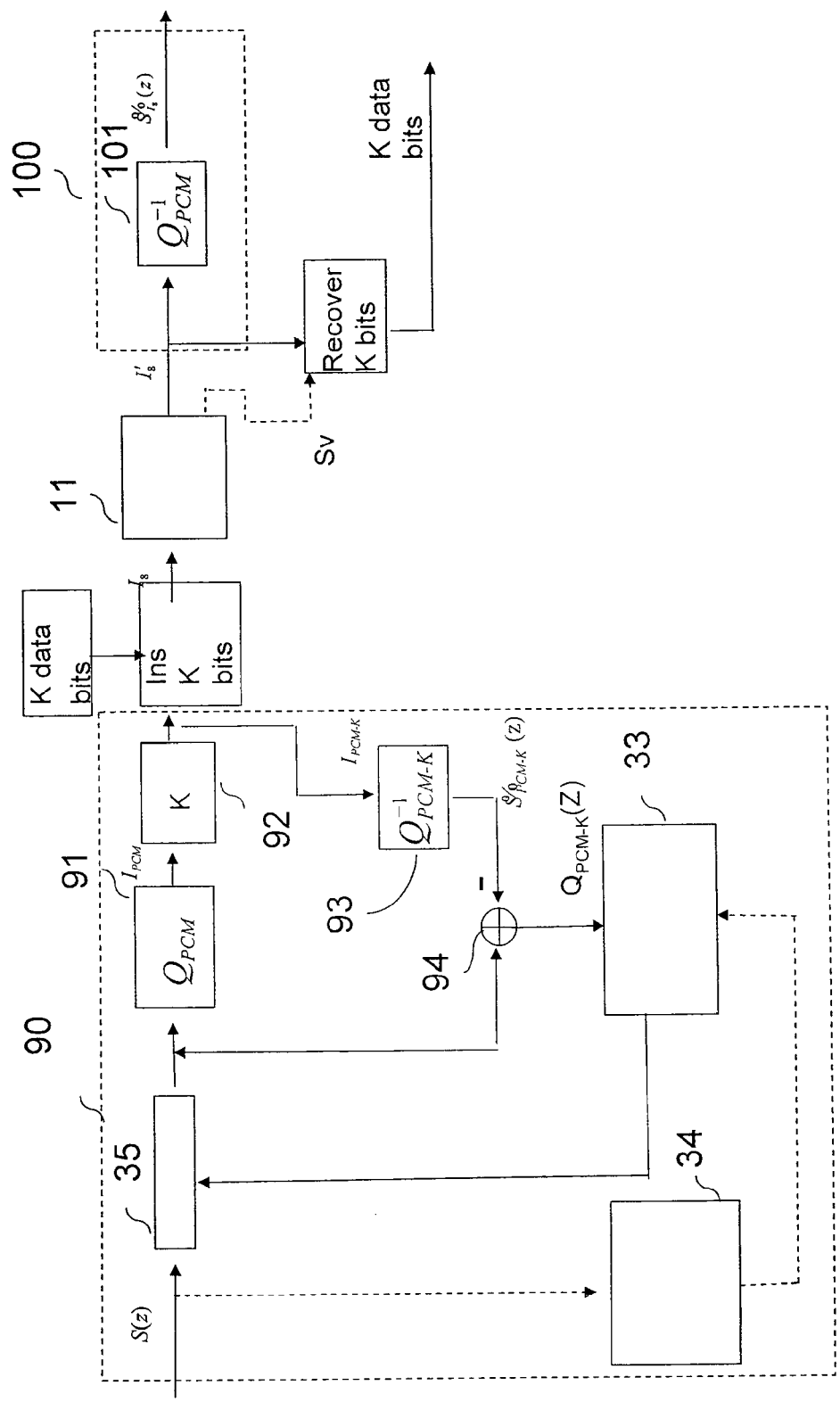
FIG. 12 is a block schematic of another embodiment of a coder of the invention and an appropriate decoder in a bit stealing context.

FIG. 12 gives an example of interleaved PCM quantization with bit stealing. The noise shaping modules 33 as described in the embodiments of FIG. 3, 4 or 5 is retained along with the adaptation module 34.

The interleaved PCM quantizing module $Q_{PCM}$ 91 is in a quantizing noise shaping feedback loop. It generates a code $I_{PCM}$ at the output of the interleaved quantizing module $Q_{PCM}$, bit rate 8 bits. The G.711 PCM code is a naturally interleaved code. It is possible to "steal" 1, 2 or 3 position bits over the segment. These bits can therefore be used to transmit auxiliary information, for example quality improvement bits for coding the additional band from 4 to 6 kHz or more. The K=1, 2 or 3 least significant bits of $I_{PCM}$ will therefore be replaced by data bits to give an index $I_8$. The quantizing noise is shaped on the basis of the output of the inverse PCM quantizing module $Q_{PCM-K}$ 93 of 8-K bits fed by the index $I_{PCM-K}$ obtained from $I_{PCM}$ by masking the K least significant bits.

Once again, this 8-K bit inverse quantizing module can be referred to as a core inverse quantizing module which has the minimum core bit rate of 8-K bits.

The quantizing noise weighting function applied by the module 33 of the invention is applied to the quantizing noise from this core inverse quantizing module.

Alternatively, bit stealing can be effected in a module outside the coder. The quantizing noise is then shaped for the G.711 $Q_{PCM}$ output.

In the decoder, if the decoder is a standard PCM decoder, the received frame of quantizing indices $I'_8$ is decoded by the inverse quantizing module $Q_{PCM}^{-1}$ 101 to given the decoded signal $\tilde{S}_{18}(n)$. The index $I'_8$ is decoded blind by the standard PCM decoder. The least significant bits, if any, are reflected in additional coding noise (6 dB are lost for each bit used for the data), but quality remains acceptable thanks to the noise shaping of the present invention and backward compatibility with earlier systems is preserved.

Moreover, if a new decoder is available and the bit rate information Sv has been transmitted by the network, the data bits can be recovered, for example for use of a wide band quality improvement layer.

In an ancillary way, the k least significant bits of the index I'$_8$ can be masked before effecting the PCM decoding, the effect of which will be to reduce the noise slightly. Note that PCM bit stealing has many applications that become of all the more benefit in proportion to how much quantizing noise shaping improves the quality of reproduction of the 8-K bit signal.

The invention claimed is:

1. A method of coding an input audio signal comprising the steps:
    combining said input audio signal with an intermediate feedback signal forming a modified input signal;
    quantizing said modified input signal;
    delivering a quantizing index binary frame of a predetermined bit rate;
    inverse quantizing of some of the quantizing indices of the binary frame corresponding to the indices of a core bit rate lower than the predetermined bit rate, to determine a core bit rate reconstructed signal;
    determining quantizing noise generated at least by the succession of the quantizing step and the inverse quantizing step;
    determining a quantizing noise filter function from said core bit rate reconstructed signal; and
    applying said filter function to said quantizing noise to obtain said intermediate feedback signal.

2. The method as claimed in claim 1, wherein the quantizing step provides at least core bit rate quantizing indices corresponding to PCM coding type core coding.

3. The method as claimed in claim 1, wherein said intermediate feedback signal is calculated from a prediction of the quantizing noise and a prediction of the filtered quantizing noise, the filtered quantizing noise being obtained by adding the intermediate signal and the quantizing noise.

4. The method as claimed in claim 1, wherein the quantizing noise filter function is furthermore calculated from periodicity characteristics of the input signal.

5. The method as claimed in claim 1, wherein the scalable quantizing step of predetermined bit rate is a PCM scalar quantizing step, the inverse quantizing step of the indices of a core bit rate lower than the predetermined bit rate applies to 8-K bits of the binary frame to determine a core bit rate reconstructed signal, and there is also effected a step of inserting K data bits.

6. A method for scalable decoding of an audio signal, said method comprising:
    a first step of inverse quantization decoding quantizing indices of a core bit rate to form a core bit rate reconstructed signal;
    a second step of inverse quantization decoding quantizing indices of a second bit rate higher than the core bit rate, executed as a function of the bit rate received on decoding, to form a reconstructed signal of higher bit rate;
    a third step of obtaining a difference signal between said core bit rate reconstructed signal and said higher bit rate reconstructed signal;
    a fourth step of determining a correction filter function from the core bit rate reconstructed signal;
    a filtering step capable of applying said correction filter function to said difference signal to obtain a corrective term;
    a fifth step of synthesizing a corrected reconstructed signal at higher bit rate capable of combining said corrective term and one of the reconstructed signals.

7. The method as claimed in claim 6, wherein said corrective term is applied to said core bit rate reconstructed signal.

8. The method as claimed in claim 6, wherein said corrective term is applied to said higher bit rate reconstructed signal.

9. A decoding method as claimed in claim 6, further comprising a step of receiving information regarding insertion of bits on coding and, in the case of insertion information on K bits, a step of masking the K bits inserted is effected before the first step of core bit rate inverse quantization.

10. An input audio signal coder comprising a combination module combining the input audio signal with an intermediate feedback signal to form a modified input signal and a bit rate scalable quantizing module for quantizing said modified input signal to deliver a binary frame of quantizing indices of predetermined bit rate, said input audio signal coder further comprising:
    a module for inverse quantization of some of the quantizing indices of the binary frame corresponding to the indices of a core bit rate lower than the predetermined bit rate, to determine a core bit rate reconstructed signal;
    a module for determining a quantizing noise generated at least by the succession of the quantizing step and the inverse quantizing step;
    a module for determining a quantizing noise filter function from said core bit rate reconstructed signal;
    a module for applying said filter function to said quantizing noise to obtain said intermediate feedback signal.

11. An audio signal decoder comprising:
    a first module for inverse quantization decoding quantizing indices at core bit rate to form a core bit rate reconstructed signal;
    a second module for inverse quantization decoding quantizing indices at a second bit rate higher than the core bit rate, executed as a function of the bit rate received on decoding, to form a reconstructed signal of higher bit rate;
    a module for obtaining a difference signal between said core bit rate reconstructed signal and said higher bit rate reconstructed signal;
    a module for determining a correction filter function from the core bit rate reconstructed signal;
    a module for applying said correction filter function to said difference signal to obtain a corrective term;
    a module for synthesizing a corrected reconstructed signal at higher bit rate by combining said corrective term and one of the reconstructed signals.

12. A computer program stored in a memory of a coder or a decoder or on a memory medium adapted to cooperate with a reader of the coder or the decoder, said computer program comprising code instructions for executing the steps of the coding method as claimed in claim 1 when said program is executed by a processor of the coder or the decoder.

13. A computer program stored in a memory of a coder or a decoder or on a memory medium adapted to cooperate with a reader of the coder or the decoder, said computer program comprising code instructions for executing the steps of the decoding method as claimed in claim 6 when said program is executed by a processor of the coder or the decoder.

* * * * *